US008709201B2

(12) United States Patent
Mueller et al.

(10) Patent No.: US 8,709,201 B2
(45) Date of Patent: Apr. 29, 2014

(54) METHOD FOR GLUING COMPONENTS, FORMING A TEMPERATURE-RESISTANT ADHESIVE LAYER

(75) Inventors: Roland Mueller, Steinheim (DE); Irene Jennrich, Winnenden (DE); Gerhard Hueftle, Aspach (DE); Patrick Stihler, Ostfildern (DE)

(73) Assignee: Robert Bosch GmbH, Stuttgart (DE)

( * ) Notice: Subject to any disclaimer, the term of this patent is extended or adjusted under 35 U.S.C. 154(b) by 347 days.

(21) Appl. No.: 12/737,883

(22) PCT Filed: Aug. 21, 2009

(86) PCT No.: PCT/EP2009/060833
§ 371 (c)(1),
(2), (4) Date: May 27, 2011

(87) PCT Pub. No.: WO2010/023166
PCT Pub. Date: Mar. 4, 2010

(65) Prior Publication Data
US 2011/0221308 A1 Sep. 15, 2011

(30) Foreign Application Priority Data

Aug. 28, 2008 (DE) .................. 10 2008 041 657

(51) Int. Cl.
| | | |
|---|---|---|
| *C09J 163/00* | (2006.01) | |
| *C09J 183/04* | (2006.01) | |
| *B32B 27/20* | (2006.01) | |
| *B32B 27/38* | (2006.01) | |
| *C08G 59/42* | (2006.01) | |
| *C08G 59/50* | (2006.01) | |
| *C08K 5/5419* | (2006.01) | |
| *C08K 3/36* | (2006.01) | |

(52) U.S. Cl.
USPC ........... 156/330; 156/329; 523/443; 523/466; 525/476

(58) Field of Classification Search
USPC .................. 156/329, 330; 523/440, 443, 466; 525/476, 523
See application file for complete search history.

(56) References Cited

U.S. PATENT DOCUMENTS

| | | | |
|---|---|---|---|
| 5,278,257 A | 1/1994 | Mülhaupt | |
| 6,251,969 B1 * | 6/2001 | Worner et al. | 523/201 |
| 7,488,539 B2 | 2/2009 | Kozakai et al. | |
| 2008/0308225 A1 * | 12/2008 | Kanamaru et al. | 156/322 |
| 2009/0294057 A1 * | 12/2009 | Liang et al. | 156/330 |

FOREIGN PATENT DOCUMENTS

| | | | | |
|---|---|---|---|---|
| CN | 1422316 | | 6/2003 | |
| CN | 1732204 | | 2/2006 | |
| DE | 100 51 051 | | 4/2002 | |
| DE | 103 45 139 | | 4/2005 | |
| EP | 1 777 278 | | 4/2007 | |
| EP | 1 862 227 | | 12/2007 | |
| JP | 59-96122 | | 6/1984 | |
| JP | 03093834 A | * | 4/1991 | C08J 3/16 |
| JP | 7-165980 | | 6/1995 | |
| JP | 2003-286391 | | 10/2003 | |
| WO | WO 2008/016889 | | 2/2008 | |
| WO | WO 2008/027119 | | 3/2008 | |
| WO | WO 2008/060545 | | 5/2008 | |
| WO | WO 2009/022574 | | 2/2009 | |
| WO | WO 2009/028432 | | 3/2009 | |

OTHER PUBLICATIONS

Abstract of JP 03093834 A, provided by the JPO website (no date).*
Translation of JP 03-093834 A, provided by USPTO translations (no date).*
DIN EN 26922 "Determination of Tensile Strength Normal to the Glued Surface", (1999).
Anonymous: "Structural Adhesives Containing Submicron Silicone Particles" IP. COM Journal, IP.COM Inc., West Henrietta, NY, US, Jul. 20, 2004.

* cited by examiner

*Primary Examiner* — Michael J Feely
(74) *Attorney, Agent, or Firm* — Kenyon & Kenyon LLP

(57) ABSTRACT

A method for gluing components is provided, forming an adhesive layer which is capable of functioning, at least in a temperature range of $\geq 100°$ C. to $\leq 160°$ C., wherein the adhesive layer is obtained from a curable reactive resin system. The reactive resin system includes an epoxy resin component and polymer particles dispersed in the epoxy resin component, the dispersed polymer particles furthermore including addition-crosslinked silicone elastomer. Also provided is the use of a reactive resin system for gluing piezo-electric ceramics and/or permanent magnets including rare earth elements and a component configuration including a piezoelectric ceramic, an impedance matching layer and an adhesive layer in contact with the piezoelectric ceramic and the impedance matching layer.

12 Claims, No Drawings

METHOD FOR GLUING COMPONENTS, FORMING A TEMPERATURE-RESISTANT ADHESIVE LAYER

BACKGROUND OF THE INVENTION

1. Field of the Invention

The present invention relates to a method for gluing components, forming an adhesive layer which is capable of functioning at least in a temperature range of ≥100° C. to ≤160° C., the adhesive layer being obtained from a curable reactive resin system. The present invention also relates to the use of a reactive resin system for gluing piezoelectric ceramics and/or permanent magnets including rare earth elements and a component configuration including a piezoelectric ceramic, an impedance matching layer and an adhesive layer in contact with the piezoelectric ceramic and the impedance matching layer.

2. Description of Related Art

Currently there are known flexible adhesives for a use range up to approximately 80° C. However, they cannot be used in applications in which higher temperatures, temperature changes, and even mechanical vibrations occur at the same time. Examples of such applications include piezoelectric ultrasonic transducers and certain electric motors.

Curable reactive resin systems are described, for example, in published German patent application document DE 103 45 139 A1. These resin systems, in particular casting compounds, lamination resins or impregnation resins, are to be processed as two-component compounds and contain a resin component, a mineral filler, and polymer particles dispersed in the resin component. The filler includes nanoparticles. However, this does not describe how such reactive resin adhesive systems behave at elevated temperatures or changing temperatures or under mechanical stresses. Thus there is still a demand for alternative and further developed methods for gluing components.

BRIEF SUMMARY OF THE INVENTION

A method for gluing components, forming an adhesive layer which is capable of functioning, at least in the temperature range of ≥100° C. to ≤160° C., is therefore proposed according to the present invention, the adhesive layer being obtained from a curable reactive resin system. This method is characterized in that the reactive resin system includes an epoxy resin component (A) and polymer particles (B) dispersed in the epoxy resin component (A), the dispersed polymer particles furthermore including addition-crosslinked silicone elastomer.

The reactive resin system is preferably to be processed as a two-component adhesive, i.e., after adding a curing agent to the resin formulation. An epoxy resin component is understood in general to be a molecule having two or more epoxy groups.

Because of the silicone elastomer particles additionally present in the epoxy resin component, the impact strength of the cured reactive resin system may be modified without negatively affecting the modulus of elasticity or the glass transition temperature. The silicone elastomer particles are obtained by an addition-crosslinking mechanism based on hydrosilylation of carbon-carbon double bonds in the polymer chain. This results in a different hydrophobicity of the particle surface in comparison with silicone elastomers crosslinked by condensation. The proportion of elastomer particles in the epoxy resin component may be, for example, ≥30% by weight to ≤50% by weight or ≥38% by weight to ≤42% by weight.

Gluing of the components themselves may be performed at room temperature, for example, and the curing of the reactive resin system at an elevated temperature.

Within the scope of the present invention, the fact that the adhesive layer is capable of functioning at least in the temperature range of ≥100° C. to ≤160° C. means in particular that the tensile strength determined according to DIN EN 26922 "Determination of Tensile Strength Normal to the Glued Surface" until failure of the adhesive bond within this temperature range preferably amounts to ≥50%, preferably ≥70% and more preferably ≥90% of the tensile strength thus determined at room temperature.

In one specific embodiment of the method according to the present invention, the reactive resin system also includes a component for adjusting thixotropic properties (C), this component (C) including hydrophilic pyrogenic silicon dioxide particles, which are present in the form of aggregates or agglomerates of primary particles, the primary particles having an average particle size of ≥1 nm to ≤25 nm. The adjustment of thixotropic properties means in particular that the reactive resin system has a lower viscosity in shearing, such as that occurring due to being pressed from a nozzle, for example, than the applied system which, however, has not been influenced mechanically. Therefore even nonhorizontal surfaces may be provided with the reactive resin system in a targeted manner. Hydrophilic pyrogenic silicon dioxide particles may be obtained by incineration of tetrachlorosilane in an oxyhydrogen gas flame. The hydrophilic properties originate from silanols and siloxane groups on the surface of the particles. According to DIN 53206, aggregates are understood to be primary particles in surface contact or edge contact with one another and agglomerates are understood to be primary particles in spot contact with one another. The average particle size of the primary particles may also be in a range of ≥5 nm to ≤20 nm or ≥10 nm to ≤15 nm. The agglomerates or aggregates may have a size of ≥20 nm to ≤100 μm, for example.

It is possible here that the component for adjusting thixotropic properties (C) may have a specific BET surface area of ≥100 m$^2$/g to ≤300 m$^2$/g and a tamped density of ≥20 g/L to ≤80 g/L. The BET surface area may preferably be determined on the basis of the DIN 66131 and DIN 66132 standards. The BET surface area determined in this way may also be in a range from ≥180 m$^2$/g to ≤220 m$^2$/g. The tamped density may be determined according to the DIN EN ISO 787/11 standard and may also be in a range of ≥50 g/L to ≤50 g/L.

In another specific embodiment of the method according to the present invention, the epoxy resin component (A) includes a resin based on bisphenol A, bisphenol B and/or bisphenol F. For example, bisphenol A-diglycidyl ether may be used.

In another specific embodiment of the method according to the present invention, the proportion by weight of the component for adjusting thixotropic properties (C) to the total proportion by weight of epoxy resin components present in the reactive resin system is in a ratio of ≥0.1:100 to ≤10:100. In the case of available finished commercial products for epoxy resin components, the additives, fillers, etc., optionally present are not taken into account in this calculation. A formulation for a reactive resin system containing 100 parts by weight of an epoxy resin component based on bisphenol A with 40% by weight of addition-crosslinking silicone elastomer particles shall be considered as an example. In addition, six parts by weight of component C in the form of a hydrophilic pyrogenic silicic acid having a BET surface area of 200 m$^2$/g are present in the formulation. This is therefore a ratio of 10:100 of the parts by weight of thixotropic agent C to bisphenol A epoxy. However, this ratio may also be reduced by adding other epoxies. Other possible ratio ranges include ≥1:100 to ≤7:100 and ≥3:100 to ≤6:100.

In another specific embodiment of the method according to the present invention, the reactive resin system also includes a curing agent component (D) selected from anhydride curing agents and/or amine curing agents. An example of an anhydride curing agent is phthalic anhydride. An example of an amine curing agent is isophoronediamine or dicyanodiamide (DiCy). In addition, an accelerator may also be added to the amine curing agents.

In another specific embodiment of the method according to the present invention, the components are piezoelectric ceramics and/or permanent magnets including rare earth elements. Examples of piezoelectric ceramics include lead zirconate titanates (PZT) and lead magnesium niobates (PMN). Examples of permanent magnets include samarium-cobalt or neodymium-iron-boron magnets. Such components, which are exposed to mechanical vibrations and changing temperatures, benefit the most from the gluing method according to the present invention. Piezoelectric ceramics may be present in ultrasonic transducers, for example. Rare earth magnets may be components of electric motors, for example.

Another subject matter of the present invention is the use of a reactive resin system con including an epoxy resin component (A) and polymer particles (B) dispersed in the epoxy resin component (A), the dispersed polymer particles furthermore including addition-crosslinked silicone elastomer for gluing magnets made of rare earth elements.

In one specific embodiment of this use, the reactive resin system also includes a component for adjusting thixotropic properties (C), this component (C) including hydrophilic pyrogenic silicon dioxide particles, which are present in the form of aggregates or agglomerates of primary particles, the primary particles having an average particle size of ≥1 nm to ≤25 nm.

Another subject matter of the present invention is the use of a reactive resin system including an epoxy resin component (A) and polymer particles (B) dispersed in the epoxy resin component (A), the dispersed polymer particles furthermore including addition-crosslinked silicone elastomer for gluing piezoelectric ceramics.

In one specific embodiment of this use, the reactive resin system also includes a component for adjusting thixotropic properties (C), this component (C) including hydrophilic pyrogenic silicon dioxide particles, which are present in the form of aggregates or agglomerates of primary particles, the primary particles having an average particle size of ≥1 nm to ≤25 nm.

Another subject matter of the present invention is a component configuration including a piezoelectric ceramic, an impedance matching layer and an adhesive layer, which is in contact with the piezoelectric ceramic and with the impedance matching layer, the adhesive layer being obtained from a curable reactive resin system including an epoxy resin component (A) and polymer particles (B) dispersed in the epoxy resin component (A), the dispersed polymer particles furthermore including addition-crosslinked silicone elastomer.

Such a component configuration is advantageously part of an ultrasonic flowmeter. Therefore in one specific embodiment, the piezoelectric ceramic is an ultrasonic transducer.

In general the piezoelectric ceramic may be, for example, a lead zirconate titanate (PZT) ceramic or a lead magnesium niobate (PMN) ceramic. The impedance matching layer improves the transfer of ultrasonic waves to and from the piezoelectric ceramic. It is preferable for it to have a density of ≥0.5 g/cm$^3$ to ≤0.6 g/cm$^3$. It has been found that the adhesive layer described in the present invention results in an improvement in the acoustic signal transmission to and from the piezoelectric element.

In another specific embodiment of this component configuration, the reactive resin system furthermore includes a component for adjusting thixotropic properties (C), this component (C) including hydrophilic pyrogenic silicon dioxide particles, which are present in the form of aggregates or agglomerates of primary particles, the primary particles having an average particle size of ≥1 nm to ≤25 nm.

In another specific embodiment of this component configuration, the component for adjusting thixotropic properties (C) has a specific BET surface area of ≥100 m$^2$/g to ≤300 m$^2$/g and a tamped density of ≥20 g/L to ≤80 g/L.

DETAILED DESCRIPTION OF THE INVENTION

The present invention is explained in greater detail on the basis of the following formulation examples of reactive resin systems. The substance designations used here have the following meanings:

Epoxy resin 1 bisphenol A epoxy resin modified using 40% by weight of silicone elastomer particles (addition-crosslinked)

Epoxy resin 2 bisphenol A epoxy resin

Epoxy resin 3 bisphenol A/F epoxy resin modified using 40% by weight of silicon dioxide nanoparticles Silicon dioxide 1 pyrogenic hydrophilic silicon dioxide having an average size of the primary particles of 12 nm and a BET surface area of 200 m$^2$/g Curing agent 1 latently accelerated anhydride curing agent Curing agent 2 fast amine curing agent of polyamines, mostly isophoronediamine Formulation 1

This formulation contained 100 parts by weight of epoxy resin 1 and 51 parts by weight of curing agent 1. The fully cured system had a glass transition temperature $T_g$ of approximately 160° C.

Formulation 2

This formulation contained 100 parts by weight of epoxy resin 1 and 20 parts by weight of curing agent 2. The fully cured system had a glass transition temperature $T_g$ of approximately 130° C.

Formulation 3

This formulation contained 50 parts by weight of epoxy resin 1 and 50 parts by weight of epoxy resin 2 plus 64.5 parts by weight of curing agent 1. The fully cured system had a glass transition temperature $T_g$ of approximately 160° C.

Formulation 4

This formulation contained 50 parts by weight of epoxy resin 1 and 50 parts by weight of epoxy resin 3 plus 51 parts by weight of curing agent 1. The fully cured system had a glass transition temperature $T_g$ of approximately 160° C.

Formulation 5

This formulation contained 100 parts by weight of epoxy resin 1 and 6 parts by weight of thixotropic agent silicon dioxide 1 plus 51 parts by weight of curing agent 1. The fully cured system had a glass transition temperature $T_g$ of approximately 160° C.

Formulation 6

This formulation contained 100 parts by weight of epoxy resin 1 and 6 parts by weight of thixotropic agent silicon dioxide 1 plus 20 parts by weight of curing agent 2. The fully cured system had a glass transition temperature $T_g$ of approximately 130° C.

Formulation 7

This formulation contained 50 parts by weight of epoxy resin 1 and 50 parts by weight of epoxy resin 2, also 5.25 parts by weight of thixotropic agent silicon dioxide 1 plus 61 parts by weight of curing agent 1. The fully cured system had a glass transition temperature $T_g$ of approximately 160° C.

Formulation 8

This formulation contained 50 parts by weight of epoxy resin 1 and 50 parts by weight of epoxy resin 3, also 4.5 parts by weight of thixotropic agent silicon dioxide 1 plus 49 parts by weight of curing agent 1. The fully cured system had a glass transition temperature $T_g$ of approximately 160° C.

The advantages of the adhesive bond according to the present invention are documented below.

In one test, a piezoelectric ceramic was glued to an impedance matching layer using the formulations according to the present invention. This ceramic had appropriate contact points so that it was able to generate ultrasound. The amplitude of the ultrasound emitted by the piezoelectric ceramic through the impedance matching layer was ascertained.

During the ultrasonic emission, a thermal shock alternation was performed at the same time, during which the temperature of the ultrasonic system was changed from −40° C. to +140° C. in five seconds and then back from +140° C. to −4° C. in five seconds. This temperature change was performed for one hour for one cycle. Worsening of the properties of the adhesive layer is manifested in a reduction in the ultrasonic amplitude with an increase in the number of thermal shock alternations.

It has been found that the ultrasonic amplitude of the test specimens having adhesive layers obtained from the formulations according to the present invention initially remained approximately stable in the course of the alternating thermal shock testing until it gradually declined. Thus more than 800 alternation cycles were run through before a decline in the ultrasonic amplitude having a negative effect on the use properties was observed. In the case of non-inventive comparative adhesive layers of epoxy resins, a greater decline in the ultrasonic amplitude was observed from the start of the alternating temperature test.

In another test the ultrasonic amplitude was ascertained as a function of the temperature in the case of piezoelectric ceramics glued to an impedance matching layer. Here again, inventive and non-inventive epoxy resin formulations were both used for the adhesive layer.

It has been found that in the case of experimental specimens glued according to the present invention, the absolute ultrasonic amplitude was higher and also the decline thereof with an increase in temperature up to the glass transition point of the epoxy resin was lower than with comparative adhesives.

What is claimed is:

1. A method comprising:
   generating, from a curable reactive resin system, an adhesive layer for gluing components and that is adapted to function at least in the temperature range of ≥100° C. to ≤160° C.;
   wherein the curable reactive resin system includes:
   an epoxy resin component;
   a curing agent;
   polymer particles that are dispersed in the epoxy resin component and that include addition-crosslinked silicone elastomer; and
   a selected component for adjusting thixotropic properties, the selected component including hydrophilic pyrogenic silicon dioxide particles present in the form of aggregates or agglomerates of primary particles, the primary particles having an average particle size of ≥1 nm to ≤25 nm.

2. The method as recited in claim 1, wherein the selected component for adjusting thixotropic properties has a specific BET surface area of ≥100 m²/g to ≤300 m²/g and a tamped density of ≥20 g/L to ≤80 g/L.

3. The method as recited in claim 2, wherein the amount by weight of the selected component for adjusting thixotropic properties is in a ratio of ≥0.1:100 to ≤10:100 to the total amount by weight of the epoxy resin components present in the curable reactive resin system.

4. The method as recited in claim 3, wherein the curing agent includes at least one of anhydride curing agents and amine curing agents.

5. The method as recited in claim 3, wherein the adhesive layer is for gluing at least two components selected from the following: (i) piezoelectric ceramics and (ii) permanent magnets including rare earth elements.

6. The method as recited in claim 1, wherein the epoxy resin component includes a resin based on at least one of bisphenol A, bisphenol B and bisphenol F.

7. The method of claim 1, further comprising:
   gluing, using the adhesive layer, at least two components selected from the following: (i) piezoelectric ceramics, and (ii) permanent magnets including rare earth elements.

8. The method of claim 7, wherein at least two permanent magnets including rare earth elements are glued.

9. The method of claim 7, wherein at least two piezoelectric ceramics are glued.

10. The method of claim 1, further comprising:
    forming a component system by placing the adhesive layer in contact with each of a piezoelectric ceramic and an impedance matching layer.

11. The method of claim 10, wherein the selected component for adjusting thixotropic properties has a specific BET surface area of ≥100 m²/g to ≤300 m²/g and has a tamped density of ≥20 g/L to ≤80 g/L.

12. The method of claim 10, wherein the piezoelectric ceramic is an ultrasonic transducer.

* * * * *

UNITED STATES PATENT AND TRADEMARK OFFICE
CERTIFICATE OF CORRECTION

PATENT NO.       : 8,709,201 B2                                             Page 1 of 1
APPLICATION NO. : 12/737883
DATED            : April 29, 2014
INVENTOR(S)      : Mueller et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 437 days.

Signed and Sealed this
Twenty-ninth Day of September, 2015

Michelle K. Lee
*Director of the United States Patent and Trademark Office*